R. Y. McCONNELL & G. PRINGLE.
Street Sprinkler.
No. 9,775. Reissued June 21, 1881.
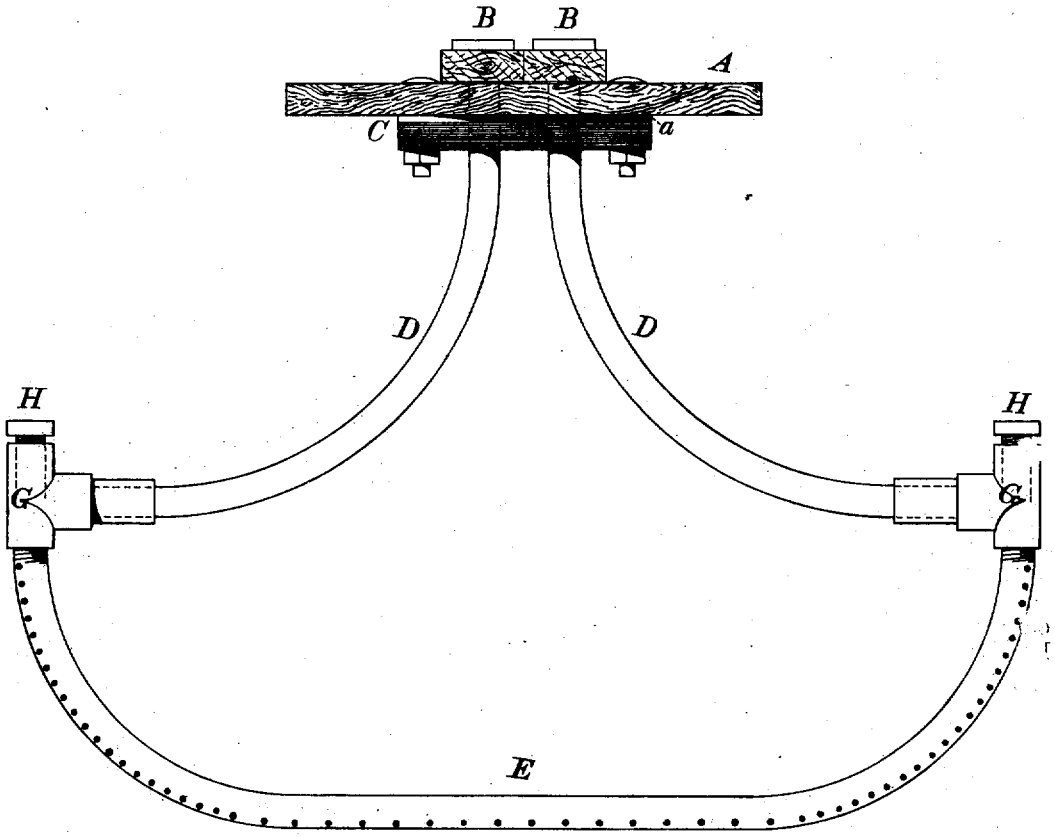
WITNESSES:
Wm. M. Rebasz Jr.
H. G. Phillips.
INVENTORS:
Robert Y. McConnell
George Pringle,
by Geo. B. Selden,
Atty.
N. PETERS, Photo-Lithographer, Washington, D. C.

BEST AVAILABLE COPY

UNITED STATES PATENT OFFICE.

ROBERT Y. McCONNELL AND GEORGE PRINGLE, OF ROCHESTER, N. Y.

STREET-SPRINKLER.

SPECIFICATION forming part of Reissued Letters Patent No. 9,775, dated June 21, 1881.

Original No. 97,422, dated November 30, 1869. Application for reissue filed March 9, 1881.

*To all whom it may concern:*

Be it known that we, ROBERT Y. McCONNELL and GEORGE PRINGLE, of Rochester, in the county of Monroe and State of New York, have invented certain new and useful Improvements in Street-Sprinklers; and we do hereby declare that the following is a full, clear, and exact description thereof, reference being had to the accompanying drawing, and to the letters of reference marked thereon, making a part of this specification.

The nature of our invention consists in the construction and arrangement of a street-sprinkler, as will be hereinafter fully set forth.

In order to enable others skilled in the art to which our invention appertains to make and use the same, we will now proceed to describe its construction and operation, referring to the annexed drawing, which represents a rear view.

A represents the bottom of the water-tank, in which are two valves, B B, through which the water is allowed to pass. These valves are operated by the driver by means of two cords, so that he can open one or both at pleasure, or shut off the water entirely.

On the under side of the bottom A is secured a block, C, to which are attached two leather, rubber, or other flexible tubes, D D, said block being provided with holes corresponding with the holes in the bottom A, covered by the valves B B. Between the bottom A and block C is inserted a piece of leather, *a*, with suitable holes, which latter is for the purpose of keeping the joint water-tight.

The flexible tubes D D are connected with the sprinkler E, of the shape shown in the drawing, by means of the joints G G, which have each a screw, H, at the end.

The sprinkler E is made of hydraulic tubing or gas-pipe two inches or two and a half inches in diameter, as the case requires, with a row of holes drilled a little above the center of the pipe, being closer at the ends and around the circle than in the center, for the purpose of allowing sufficient water to escape at the circle to allow for the greater amount of ground it covers than the center, so that all parts will be evenly sprinkled. The sprinkler is held in position by means of suitable braces that are attached to the frame of the wagon.

By taking the water into the sprinkler at both ends, as above described, we get the pressure to spread the water where it is required.

The screws H H in the ends of the sprinkler can be taken out for the purpose of cleaning out the pipe without taking out the tubing, which can be done by taking out one of the screws and opening the opposite valve while the tank is full of water.

We are aware that perforated sprinkler-tubes provided with curved ends have been heretofore used.

Having thus fully described our invention, what we claim as new, and desire to secure by Letters Patent, is—

1. The combination, with the water-tank of a street-sprinkler and suitable supply-piping, of the sprinkler-tube E, having curved ends, and provided with a series of water-discharge openings located on the rear side of the tube, and arranged closer together around the curved ends than at the center, whereby the water is delivered evenly over an area of ground wider than the length of the curved sprinkler-tube, substantially as described.

2. The combination, with the water-tank of a street-sprinkler, of the sprinkling-tube E, having curved ends, and provided with a series of water-discharge openings arranged closer together around the curved ends than at the center, and the supply-pipes D D, arranged to deliver the water to the sprinkler-tube where the discharge-openings are most numerous, substantially as described.

3. The combination, with the water-tank and sprinkler-tube of a street-sprinkler, of the flexible tubes D D, connected to the water-tank by means of a supplementary block, C, secured to the bottom of the tank, substantially as herein set forth.

4. The combination, with the water-tank and sprinkler-tube of a street-sprinkler, and the supply-pipes D D, of the double valves placed inside of the water-tank, so as to be able to let on water at either side or together at pleasure, substantially as herein set forth.

5. The combination, with the water-tank of a street-sprinkler, and suitable supply-piping, of the perforated sprinkler-tube E, provided with a removable attachment for opening the tube for the purpose of cleaning the same by the discharge of water therethrough, substantially as described.

6. The combination and arrangement of the bottom A, valves B B, flexible tubes D D, sprinkler-tube E, joints G G, and screws H H, substantially as described.

7. The combination, with the water-tank of a street-sprinkler, of the sprinkling-tube E, provided with a series of water-discharge openings connected to said tank by the flexible supply-tubes D D, substantially as described.

8. The sprinkler-tube E, provided on its rear side with a series of water-discharge openings drilled above the center of the pipe, and closer together around the curved ends than at the center, substantially as and for the purposes set forth.

ROBERT Y. McCONNELL.
GEORGE PRINGLE.

Witnesses:
GEO. B. SELDEN,
H. G. PHILLIPS.